United States Patent [19]
Lee et al.

[11] Patent Number: 5,633,511
[45] Date of Patent: May 27, 1997

[54] AUTOMATIC TONE SCALE ADJUSTMENT USING IMAGE ACTIVITY MEASURES

[75] Inventors: Hsien-Che Lee, Penfield; Lori L. Barski, Mendon; Robert A. Senn, Rochester, all of N.Y.

[73] Assignee: Eastman Kodak Company, Rochester, N.Y.

[21] Appl. No.: 577,756

[22] Filed: Dec. 22, 1995

[51] Int. Cl.$^6$ .................................................. G03B 42/02
[52] U.S. Cl. ............................................ 250/587; 382/132
[58] Field of Search ............................... 250/587; 382/132

[56] References Cited

U.S. PATENT DOCUMENTS

| | | | |
|---|---|---|---|
| 4,302,672 | 11/1981 | Kato et al. | |
| 4,641,267 | 2/1987 | Asai et al. | |
| 4,731,863 | 3/1988 | Sezan et al. | 382/172 |
| 4,859,850 | 8/1989 | Funahashi et al. | 250/587 |
| 4,914,295 | 4/1990 | Shimura et al. | |
| 4,970,393 | 11/1990 | Funahashi | 250/587 |
| 5,046,118 | 9/1991 | Ajewole et al. | |
| 5,164,993 | 11/1992 | Capozzi et al. | 382/132 |
| 5,268,967 | 12/1993 | Jang et al. | |
| 5,343,390 | 8/1994 | Doi et al. | 382/132 |
| 5,369,572 | 11/1994 | Haraki et al. | 364/413.13 |

*Primary Examiner*—Constantine Hannaher
*Attorney, Agent, or Firm*—William F. Noval

[57] ABSTRACT

A method of automatically adjusting the tone scale adjustment for digital radiographic images. The method includes the steps of providing an input digital radiographic image; estimating the image noise as a function of code value of the image; determining the range of code values in the input image; determining which way the input image should be processed; determining a bounding box which contains the region of interest of the input image; computing the image activity histogram of the input image; determining four points from the image activity histogram; constructing the tone-scale curve for the input image; and mapping the input image through the tone-scale curve to produce an output image with good tone scale.

22 Claims, 14 Drawing Sheets

| 0 | -1 | 0 |
|---|----|---|
| -1 | 4 | -1 |
| 0 | -1 | 0 |

LAPLACIAN

| -1 | 0 | 1 |
|----|---|---|
| -1 | 0 | 1 |
| -1 | 0 | 1 |

HORIZONTAL EDGE

| -1 | -1 | -1 |
|----|----|----|
| 0 | 0 | 0 |
| 1 | 1 | 1 |

VERTICAL GRADIENT

| $c_1$ | $c_2$ | $c_3$ | $c_4$ | $c_5$ |
|---|---|---|---|---|
| $c_6$ | $c_7$ | $c_8$ | $c_9$ | $c_{10}$ |
| $c_{11}$ | $c_{12}$ | $c_0$ | $c_{13}$ | $c_{14}$ |
| $c_{15}$ | $c_{16}$ | $c_{17}$ | $c_{18}$ | $c_{19}$ |
| $c_{20}$ | $c_{21}$ | $c_{22}$ | $c_{23}$ | $c_{24}$ |

CODE-VALUE CO-OCCURRENCE

LEVEL-CROSSINGS

1

AUTOMATIC TONE SCALE ADJUSTMENT USING IMAGE ACTIVITY MEASURES

FIELD OF THE INVENTION

This invention discloses an automatic tone scale adjustment method for digital images in general and for computed radiographic images in particular. The tone scale adjustment is to render an input image on an output media for visual inspection or examination.

BACKGROUND OF THE INVENTION

Computed radiography uses storage phosphors to record the radiation image from x-ray transmission. The stored image is then read out by light-stimulated emission, which is amplified by a photomultiplier, transformed into desired signal units (such as log-exposure) and quantified into digital numbers called code values. The code values can be, recorded with a certain number of bits. For a 12-bit digital image, the code value ranges from 0 to 4095. These code values are then manipulated by computers and then mapped through a tone-scale curve to an output display, such as a cathode-ray-tube monitor or a photographic film.

Computed radiography using storage phosphors offers a very wide exposure latitude (10,000:1) compared with that of the conventional screen/film systems, (40:1). This means that exposure error is much less serious for computed radiography at the time of image sensing and recording (but not at the time of image display, as will be explained later). It also means that the tone scale mapping in computed radiography can be specifically tailored to provide an optimal rendition of every individual image. However, most output media, such as photographic film and cathode ray tube (CRT), do not have wide enough dynamic ranges to display the 10,000:1 latitude of information with proper visual contrast. It is, therefore, necessary to carefully allocate the available output dynamic range to display the clinically important part of the input code values. For some applications, the interested range of the input image may exceed that provided by the output media and the contrast of parts of the input image will have to be compromised. U.S. Pat. No. 4,302,672 teaches a method of constructing such a compromised tone-scale curve for chest x-ray images. However, that method uses the valleys and peaks of the code-value histogram to identify the critical points between the spine, the heart, and the lung. The results are not very reliable because these valleys and peaks are not always clearly detectable. Furthermore, the method cannot be generalized to examinations other than chest images.

There are mainly five classes of "objects" in radiographic images: (1) the foreground (collimator blades used to protect parts of the body from unnecessary x-ray exposure) usually corresponding to very low to low exposure areas; (2) the man-made objects (such as pacemakers, tubes, and electrodes); (3) the soft tissues (such as muscles, blood vessels, and intestines) usually correspond to low (e.g., mediastinum) to high (e.g., lung) exposures depending on the thickness; (4) the bones corresponding to the very low to low exposures (often overlaps with the foreground); and (5) the background corresponding to the very high exposure areas. These five classes of objects are very difficult to separate using the code value alone because, there are considerable overlaps (such as the bone and the collimator blades).

The two basic problems in the tone scale adjustment for computed radiography are: (1) to determine which sub-range of the input code values is most important for clinical evaluation and (2) to construct a tone-scale transfer curve so that the important sub-range of the code values identified in step (1) can be rendered with proper contrast and brightness (density) on the output media. For example, the digital code values of an input chest x-ray image may span from 500 to 3000 (in units of 0.001 log exposure), but, the code value range of the lung area, being the most important region of the image, may only span from 1800 to 2600. If we attempt to map the entire range of the input code value (from 500 to 3000) to the available film density range with equal contrast for all input code values, we will produce a chest image with an unacceptably low contrast. It is therefore very important to have an automatic algorithm to detect and select the relevant sub-range of the input code values (1800 to 2600) to be displayed on the output media with proper visual contrast and brightness. The process of selecting the relevant sub-range of input code values and constructing the proper mapping function from the input code value to the output display media is called the tone scale adjustment.

The first problem, selecting the important code value sub-range, has been approached in the past by using the histogram of the input code values either in exposure space or in log-exposure space. (We will refer this histogram as the code-value histogram to differentiate it from the image activity histogram used in this invention.) U.S. Pat. No. 4,914,295 teaches a method for excluding the irrelevant background region in an image by detecting a peak in the code-value histogram near the maximum input code value. This method requires a prior filter to remove the image region covered by the collimator blades. It also needs a different preconstructed tone-scale curve in accordance with the examination type entered by the operator. U.S. Pat. No. 5,046,118 discloses a method of analyzing the code-value histogram by an entropy measure. U.S. Pat. No. 5,268,967 teaches a method of using edge density for segmenting image into foreground, background, and body part regions. It also relies on the prior knowledge of the body part being examined.

All the prior art methods attempted to perform the tone scale adjustment of an input image based on the analysis of its code-value histogram. A code-value histogram contains only the information about the number of pixels at various exposure or log-exposure values. It does not tell us which code value sub-range, contains the important body part image. Analysis of this type of histogram is thus always performed under various ad hoc assumptions about the image contents. When the assumptions are not valid for an input image, these methods tend to produce a very unacceptable output image.

The second problem, constructing the proper tone-scale curve, has been approached in the past in two different ways. U.S. Pat. No. 4,641,267 teaches a method of providing a set of reference tone-scale curves (about 10 of them) to choose from and for each chosen reference curve a slight adjustment of exposure and contrast is made based on the code-value histogram. The tone-scale curve used depends only slightly on an individual image, but rather mostly on its examination type. This has the advantage of providing a consistent appearance of the final displayed images for any given examination type. U.S. Pat. No. 5,164,993 teaches another method for constructing a tone-scale transfer curve based on the code-value histogram, such that the output density is substantially a linear function of the input exposure. The resulting tone-scale curve is highly image dependent. This has the potential of providing a customized, optimal tone-scale curve for each individual image. However, both methods rely on the code-value histogram and do not consider the characteristics of human visual system for tone-scale construction. Both methods also require separate preprocessing procedures for eliminating the image regions that correspond to the background and the collimator blades.

A good tone-scale curve should render the detailed structure of the input image easily visible. Image regions that contain modulated signals should be allocated with sufficient contrast and image regions that show little signal modulation can be rendered with low contrast. Signal modulations represent image activities and should be measured as a function of code values.

SUMMARY OF THE INVENTION

According to the present invention, the problems set forth above of selecting the important code value sub-range and constructing an optimal tone-scale curve is solved by measuring the image activity as a function of code value. In general an activity histogram is computed from the input image signals and the important code value sub-range is identified by examining the shape of both the activity histogram and the code-value histogram. The tone-scale curve is then constructed based on the critical points detected on the activity histogram and also on the characteristics of human brightness perception. The resulting tone-scale adjustment is such that important details of the body part are rendered equally visible throughout the entire luminance range of the displayed image. Instead of the code-value histogram, this invention computes a measure that is related to local image activity and uses the image activity histogram to extract the important code value sub-range where signals are modulated. The code values that show a lot of image activity are given good contrast in the tone transfer curve. Those that show little image activity are given low contrast budget or are compressed entirely.

According to a feature of the present invention, there is provided a method of automatic tone scale adjustment for digital radiographic images comprising the steps of:
  providing an input digital radiographic image;
  estimating the image noise as a function of code value of said image;
  determining the range of code values in said input image;
  determining which way said input image should be processed;
  determining a bounding box which contains the region of interest of said input image;
  computing the image activity histogram of said input image;
  determining four points from said image activity histogram;
  constructing the tone-scale curve for said input image; and
  mapping said input image through said tone-scale curve to produce an output image with good tone scale.

The present invention has the following advantages.

1. The important code value sub-range is often more correctly identified because it relies on the image activity rather the code-value histogram and ad hoc assumptions.

2. The visual contrast and brightness of the output image are rendered better according to the image activity histogram, instead of the code-value histogram.

3. The simplicity of the activity measure and its resulting high speed of execution.

4. The method will work without any prior information about the body part being examined.

5. Because the tone scale curve is based on image activity and not a code-value histogram alone, it does not impose rigid templates for image composition. The pertinent information is automatically extracted from the image signal itself and the final tone-scale transfer curve is automatically constructed and adjusted for each input image.

6. Furthermore, when information about examination type is available, this invention uses it to fine tune the tone-scale parameters. When information about examination type is missing, this invention will rely on the image signal alone and can still provide a very good tone scale.

DESCRIPTION OF THE EMBODIMENTS

Figure 16:
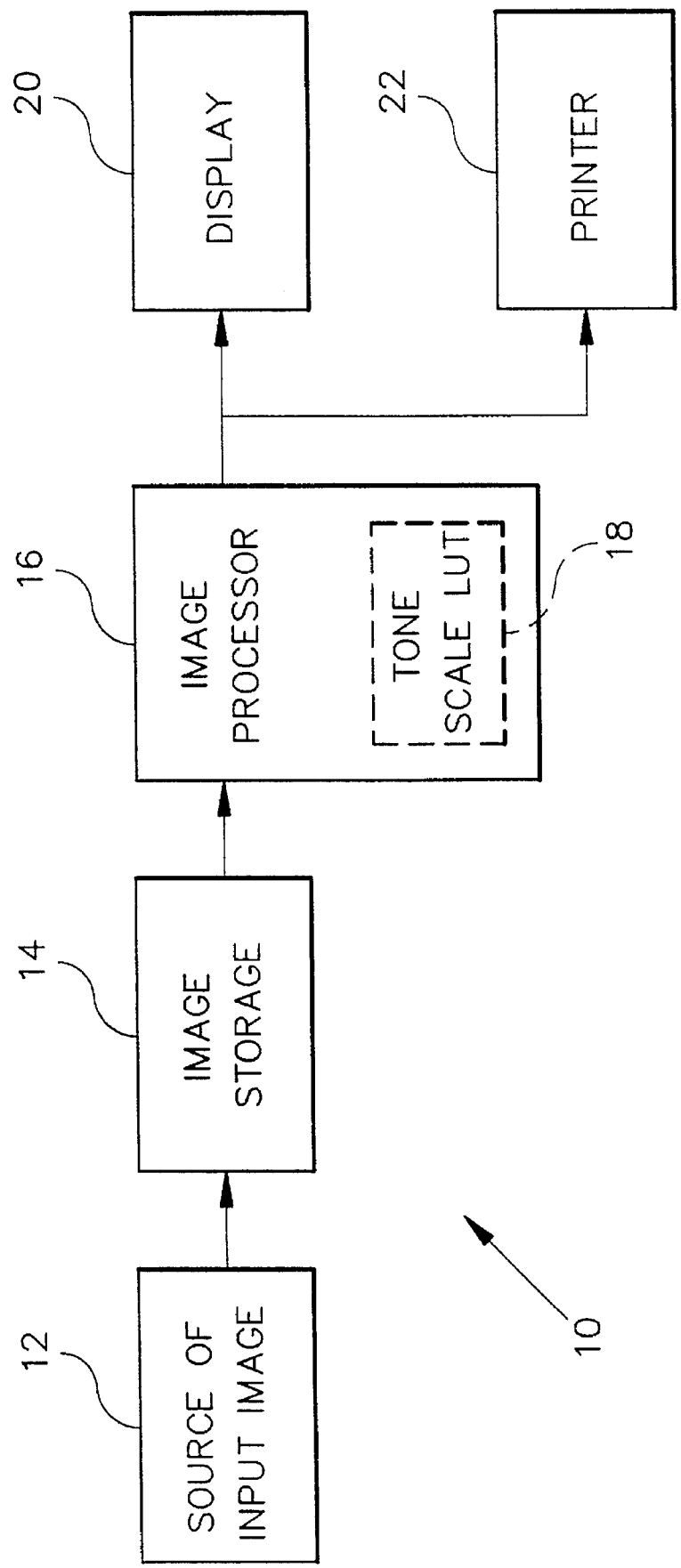
FIG. 16 is a block diagram of a digital imaging system incorporating the present invention.

Although the method of the present invention is described with particular reference to digital radiographic image systems, it will be understood by those skilled in the art that the method is also applicable to digital image systems in general. Referring to FIG. 16, there is shown in block diagram a digital radiographic imaging system incorporating the method of the present invention. As shown, the system 10 includes a source 12 of digital radiographic images. The digital radiographic image includes a matrix of m×n pixels, where there are m pixels per line and n lines. Source 12 can be, for example, a storage phosphor reader which converts x-ray images stored in storage phosphors into digital radiographic images; a film digitizer which digitizes a radiographic image on x-ray film; a magnetic or optical archive storage system for storing digital radiographic images; a diagnostic imaging modality (such as MRI, CT, PET, US); or a transmission channel. The digital radiographic image from source 12 is stored in temporary storage 14. The method of the present invention is carried out by image processor 16. Image processor 16 can be a computer, an image processing board, or other type of image processor well known to those skilled in the art. Image processor stores the resultant tone scale curve in a tone scale look-up table (LUT) 18. The input digital radiographic image is mapped through LUT 18 to produce an output digital radiographic image with the important code-value sub-range and with the optimal tone scale for that sub-range.

Figure 1:
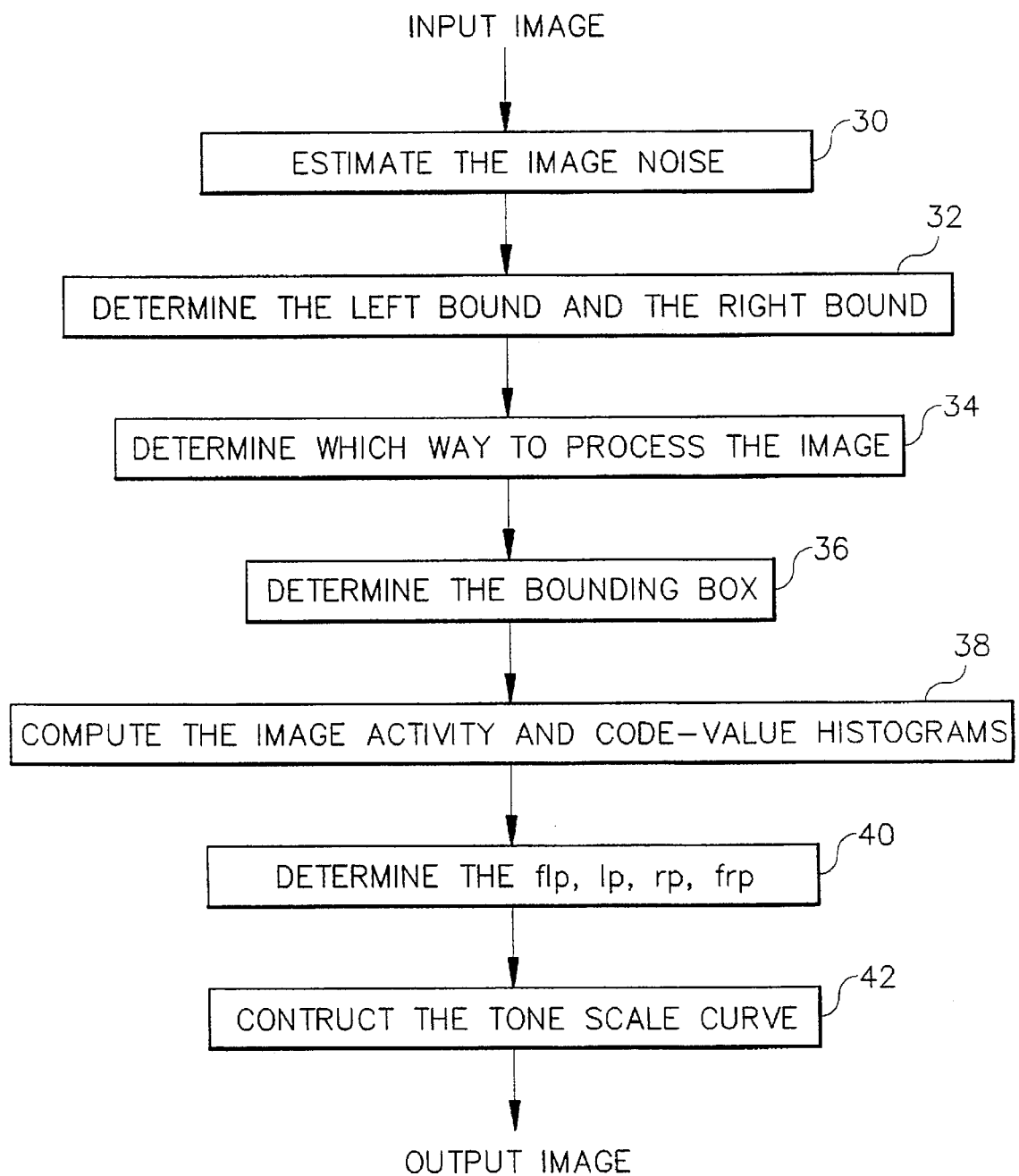
FIG. 1 is a block diagram of an embodiment of the tone scale adjustment method according to the present invention.

Referring now to FIG. 1, there is shown a block diagram of the tone scale adjustment method according to the present invention. The radiation image acquired from source 12 (such as scanning a x-ray-exposed storage phosphor) is digitized into code values representing log-exposures times 1000. 12 bits are used for the input digitized image. The first step (box 30) estimates the image noise as a function of code values. This noise function provides an uncertainty measure for each code value. This uncertainty is called the noise margin. The next step (box 32) determines the left-bound and the right-bound of the input code values. The next step (box 34) is to determine which way to process the image. The following step (box 36) determines a convex bounding box which excludes part of the irrelevant foreground or background. The next step (box 38) computes the activity histogram and the code-value histogram from the image area inside the bounding box. From these two histograms, the next step (box 40) locates four points in the input code value range. These four points are called the far-left, the left, the right, and the far-right point. The code varies between the left point and the right point correspond to the important body part being examined. The far-left point and the far-right point represent the end points of image activity. In the last step (box 42), these four points are used to construct the final visually-optimized tone-scale curve for the input image to produce an output image.

According to the present invention, the most relevant code-value range (input code values) in a computed radiographic image is determined by the image activities. Several types of image activity can be measured as a function of code values. Four of the image activity measures are shown in FIGS. 2a–2d. The first three are the Laplacian (FIG. 2(a)), the edge gradient (FIG. 2(b)), and the code value co-occurrence (FIG. 2(c)). They have been widely used in digital image processing (as described in the book, "Digital Image Processing" by W. K. Pratt, Second Edition, John Wiley & Sons, New York, 1991, pages 503, 519, and 584). The fourth image activity measure is the level-crossings (FIG. 2(d)). Other measures of image activity (such as any local measure of signal variations, e.g., standard deviation, mean or median of absolute deviation, or signal range in a local image region) can also be used, but will not be discussed further. According to a feature of the invention, the level-crossings are used as a measure of image activity. The number of times a given input code value is crossed along an image line, is accumulated for all lines inside the bounding box in the image. These crossings for each input code-value level are called the level-crossings of the code value. Since the number of level-crossing represents the activity of signal modulation around a code value, it can be used as a measure of the image activity at that code value. This invention discloses an efficient means for calculating the level-crossing histogram and for using it to construct the tone-scale transfer curve.

The seven major steps of the tone-scale adjustment method of this invention are described in detail as follows:

(1) Estimating the image noise as a function of code values:

In order to distinguish the actual image activity from the noise fluctuations, it is necessary to estimate the image noise as a function of the code value because in computed radiography, the noise is dependent on the signal. There are two ways to estimate the noise variation: (a) The off-line method uses a gray scale of uniform patches at different exposure. The noise is calculated from the standard deviation of the code-values in each uniformly exposed area. The noise at any level of code value is then interpolated from the noise measurements of the neighboring exposures. (b) The on-line method computes the edge gradient of every pixel to distinguish the uniform area from the busy area in an image, and the noise value is estimated from the standard deviation in the uniform area. Again, the noise at any level of code value is then interpolated from the noise estimated at the neighboring exposures.

The estimated image noise as a function of code value is used throughout the later processing. For example, if we want to check if the signal has reached a certain level, it is necessary to provide a margin of uncertainty due to noise. If the noise standard deviation is 6 and the signal level we want to check is 2000, then for code values between 1994=2000–6 and 2006=2000+6, we can consider them as within one noise standard deviation of the signal 2000. This uncertainty margin due to noise is called the noise margin. In the preferred embodiment, the noise margin, NOISE, is set at 2.5 times the noise standard deviation, corresponding to a confidence interval of 98.7% because the noise is distributed very close to a Gaussian distribution.

Figure 3:
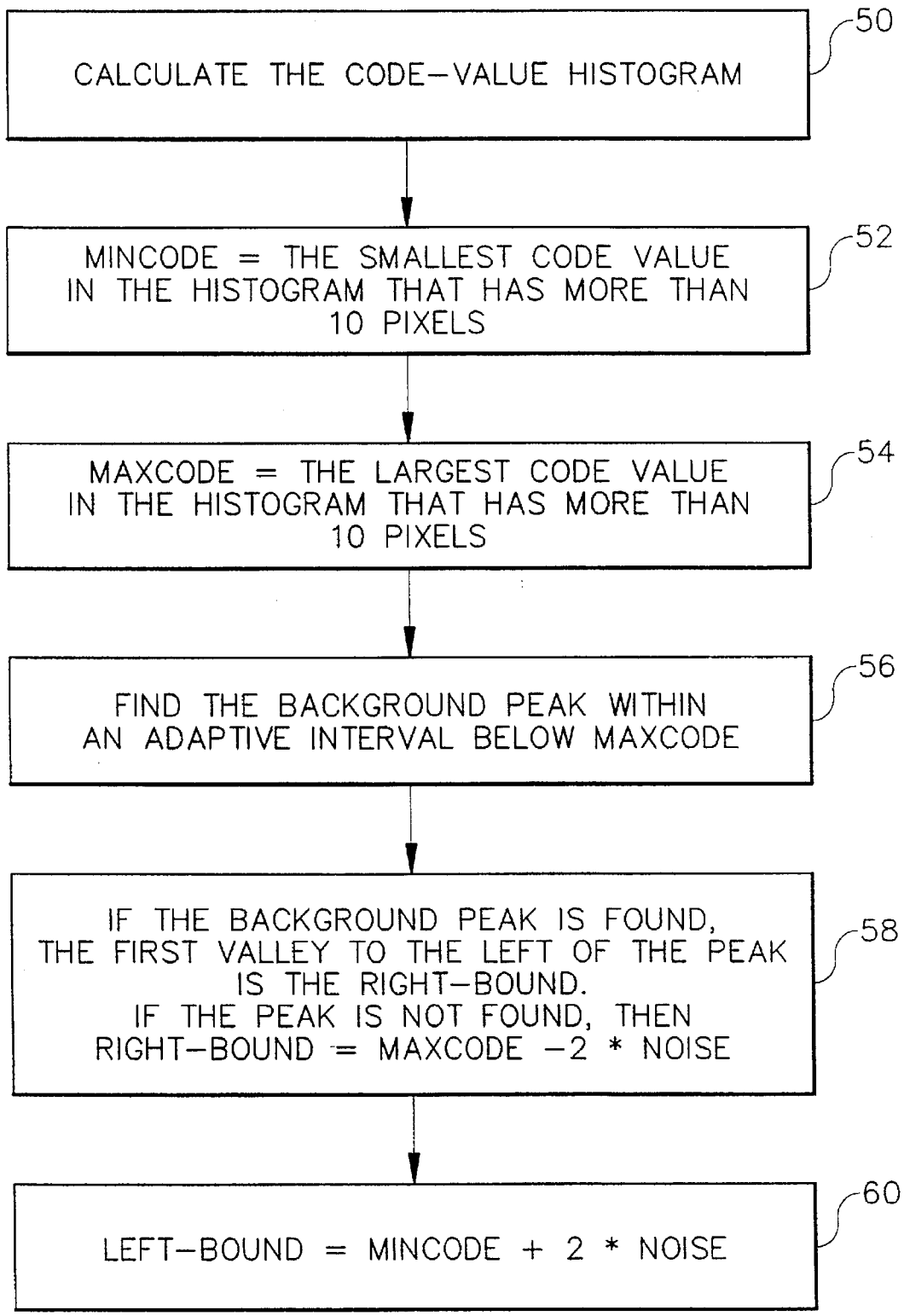
FIG. 3 is a block diagram showing a procedure for determining left-bound and right-bound points.

(2) Determining the left-bound and the right-bound points which define the range of code values in the input image:

The code-value range of any single input image usually does not occupy the entire dynamic range of the image acquisition system. Before the tone scale adjustment process begins to analyze the image data, some preprocessing steps to exclude irrelevant data, such as those from the background and the foreground, are desirable for simplifying the later processing steps and for reducing the probability of errors. However, it should be pointed out that one of the major advantages of this invention is that no perfect exclusion of all irrelevant data is required in the preprocessing because the image activity measure used in this invention can automatically select the relevant data later. The purpose of excluding the irrelevant data is to speed up the later processing and to reduce probability error. The goal of these preprocessing steps are to determine the minimum and the maximum code values that cover the whole range of log exposures to be considered. They are called the left-bound and the right-bound points. Code values beyond these two bounds are not considered farther. FIG. 3 shows the procedure involved in determining the left-bound and the right-bound.

The background image areas receive direct x-ray exposure. They are irrelevant for tone scale adjustment and are characterized (1) by the high code values and (2) by the lack of significant modulation. These two features are used to detect background areas in the image. The code-value histogram of the background areas or the code-value histogram of the entire input image is formed (box 50). The mincode (box 52) and the maxcode (box 54) are determined. The next step (box 56) first attempts to find the background peak within an adaptive (or a predetermined) interval below the maximum code value of the histogram that has a count greater than 10 pixels. The right-bound is then placed at near the valley below the background peak (box 58). If no background peak is found, the right-bound is placed at two times the noise margin below the maximum code value.

The foreground image areas usually receive the least x-ray exposure, but they are more difficult to locate, because they are much less uniform than the background and cover a much wider code locate range that usually overlaps substantially with that of the bone tissues. The foreground areas thus cannot be separated from the body part simply by code values alone. The method therefore uses the code-value histogram of the entire input image. The left-bound is two times noise margin added to the minimum code value of the histogram that has a count greater than 10 pixels (box 60). The noise margin as a function of code values is determined in step (1).

If the difference between right-bound and left-bound is less than 0.30 in log exposure, there is sufficient dynamic contrast to print the image on the film and further analysis is not necessary.

Figure 4:
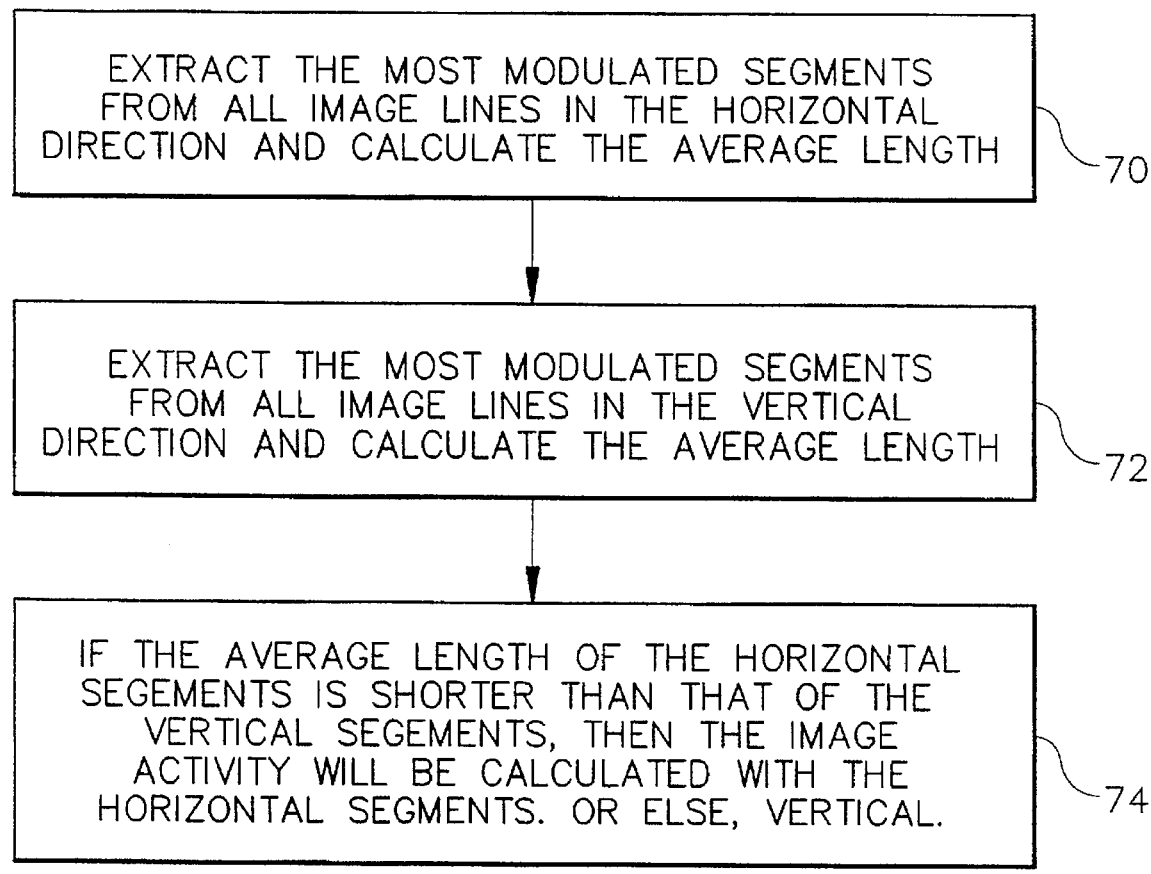
FIG. 4 is a block diagram showing how to determine which orientation the image should be processed.

(3) Determine which orientation the image should be processed:

Some of the image activity measures used in this invention are calculated from the input image on a line by line basis. For certain image types, such as hands, feet, and arms, the orientation they are processed will affect the image activity measure. In general, the image line being processed should be perpendicular to the bone. FIG. 4 shows how to determine which orientation the image should be processed. In order to determine which way the image 5 should be processed, the image was preprocessed in, two orientations, i.e., horizontal (box 70) and vertical (box 72) (with one rotated 90 degree from the other) to see which orientation has shorter average line segments that are located between sharp transitions and show significant image activity. The orientation that has the shorter active line segments is selected for the later processing (box 74).

Figure 5:
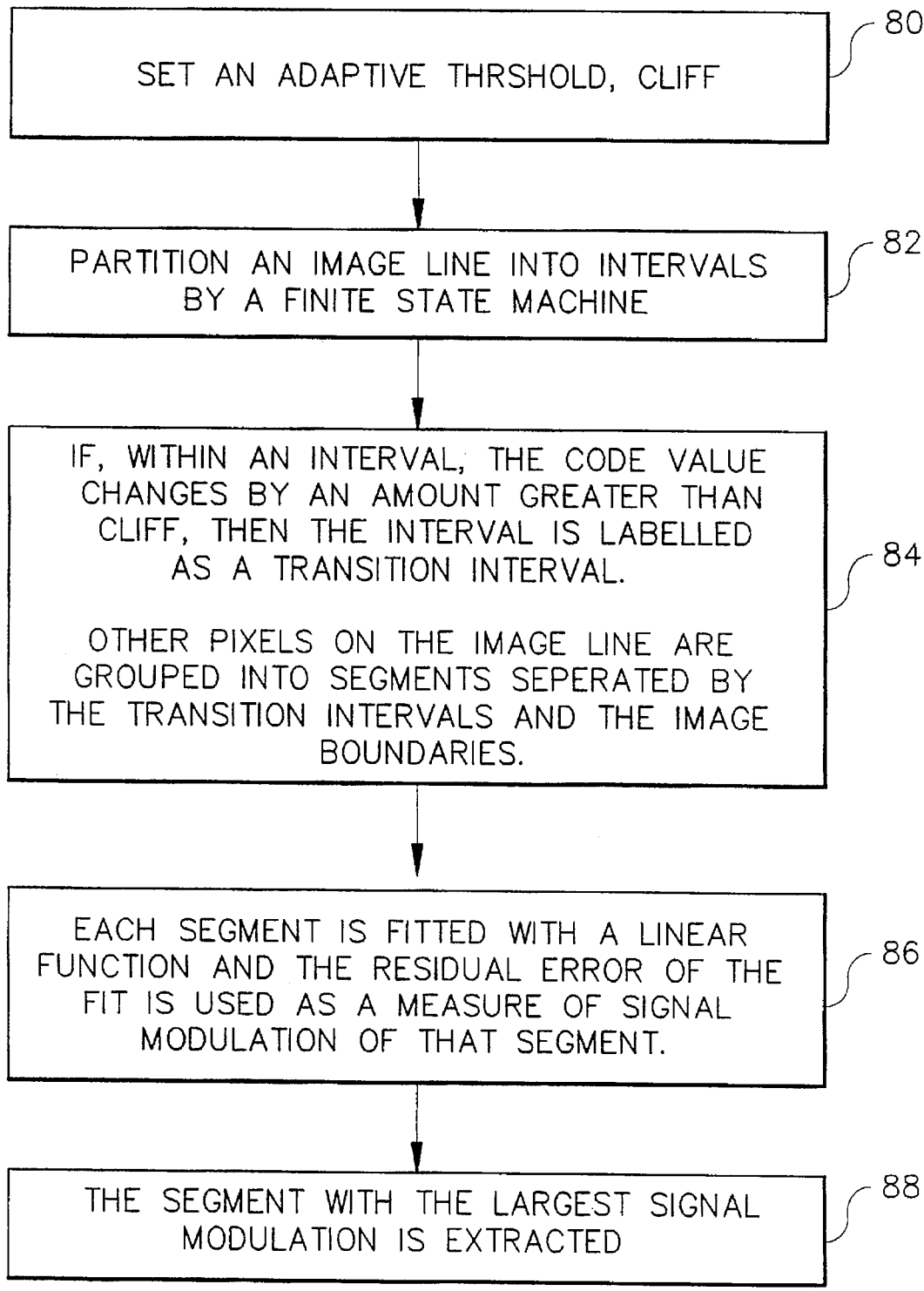
FIG. 5 is a block diagram showing an "extract" routine.
Figure 6:
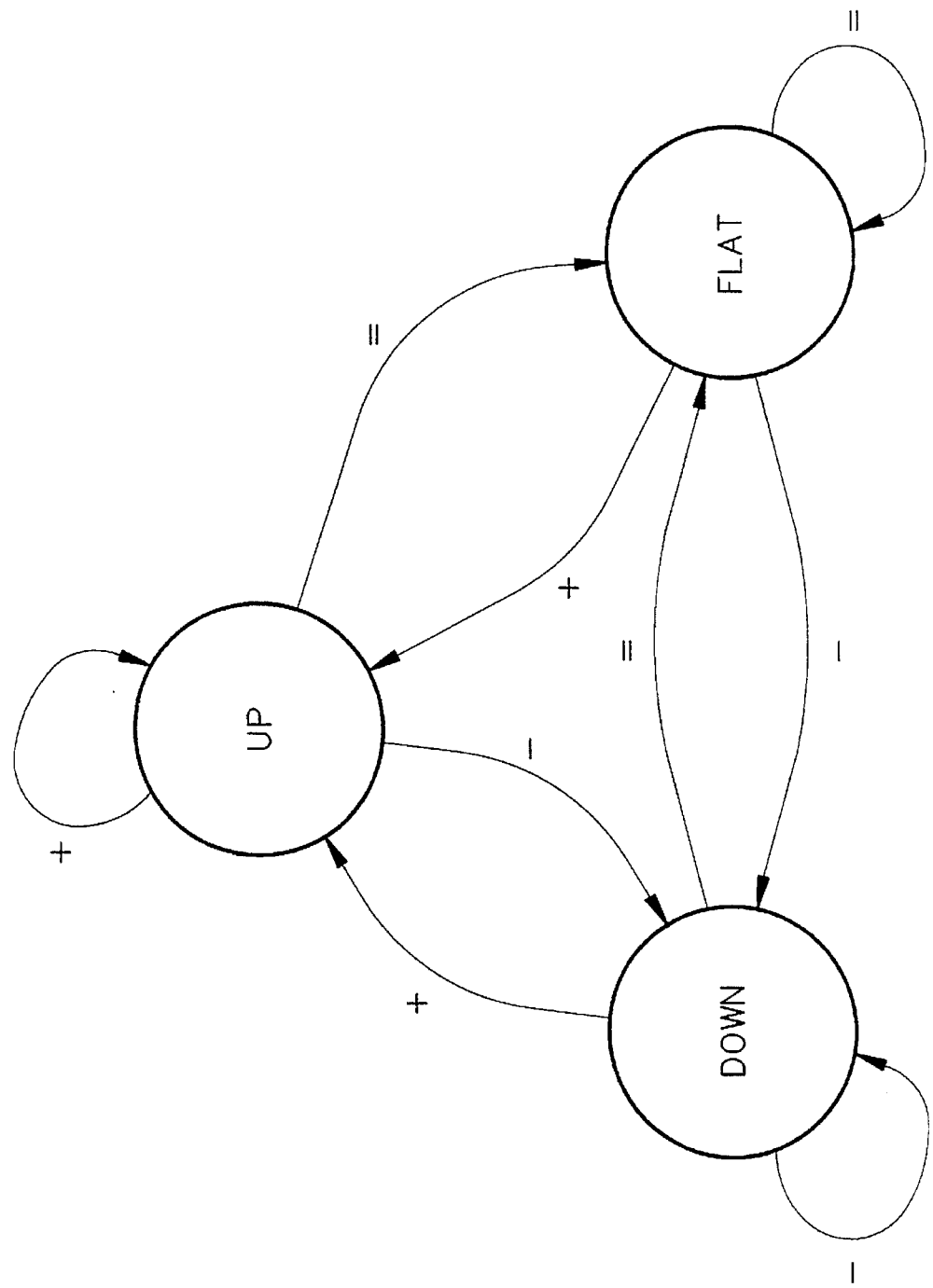
FIG. 6 is a diagram of a finite state machine for identifying transition intervals in the profile of an image line.

This procedure uses a processing routine that extract the most modulated (busy) segment from a given image line. This "extract" routine is shown in FIG. 5. It performs the line segmentation by identifying transition intervals. It is observed that the transition between the body part and the background (or the foreground) is characterized by a large increase or decrease of the image code value. Within the transition, the signal change is so dramatic that the image profile (across any image line) shows monotonic rise or fall in code value, noise being too small to create fluctuation. The first step (box 80) is to set an adaptive threshold (CLIFF). The next step (box 82) in the preprocessing is to identify these transition intervals in the profile of an image line. This is accomplished by a finite state machine, shown in FIG. 6, where the input symbols "+", "−", and "=" represent that the code value of the current pixel is greater than, less than, or equal to the code value of the previous pixel. A continuous sequence of pixels (an interval) showing monotonic trend of increasing or decreasing exposure is identified by this finite state machine. If the code value change within an interval is greater than a threshold, CLIFF, then the interval is classified as a transition interval (box 84). For each segment of pixels separated by the transition intervals, a linear function is fitted to it and the square error of the fit is used as the basic measure of busyness of the segment (box 86). The final busyness of a line segment is weighted according to its length and its code values. If the segment is too long or too short, its busyness is discounted. If the segment contains code values that are close to the right-bound or the left-bound points, its busyness is also discounted. After all these adjustments of busyness, the most busy segment in each line is used in the calculation of the bounding box (box 88).

(4) Determining the bounding box:

The next step is to determine the bounding box for the region of interest. In certain examination types, such as extremities and pediatrics, the body part under examination is often only a fraction of the total image area. Other areas on these types of image may have irrelevant objects that need not be considered for tone scale purpose. It is therefore beneficial to eliminate the irrelevant image areas from further consideration as early as possible, not only because it reduces the risk of false activity, but also because it saves computation time. This is accomplished by excluding the area outside of the bounding box from further data analysis. A bounding box is a rectangular area that usually covers only 25% to 65% of the input image area.

Figure 7:
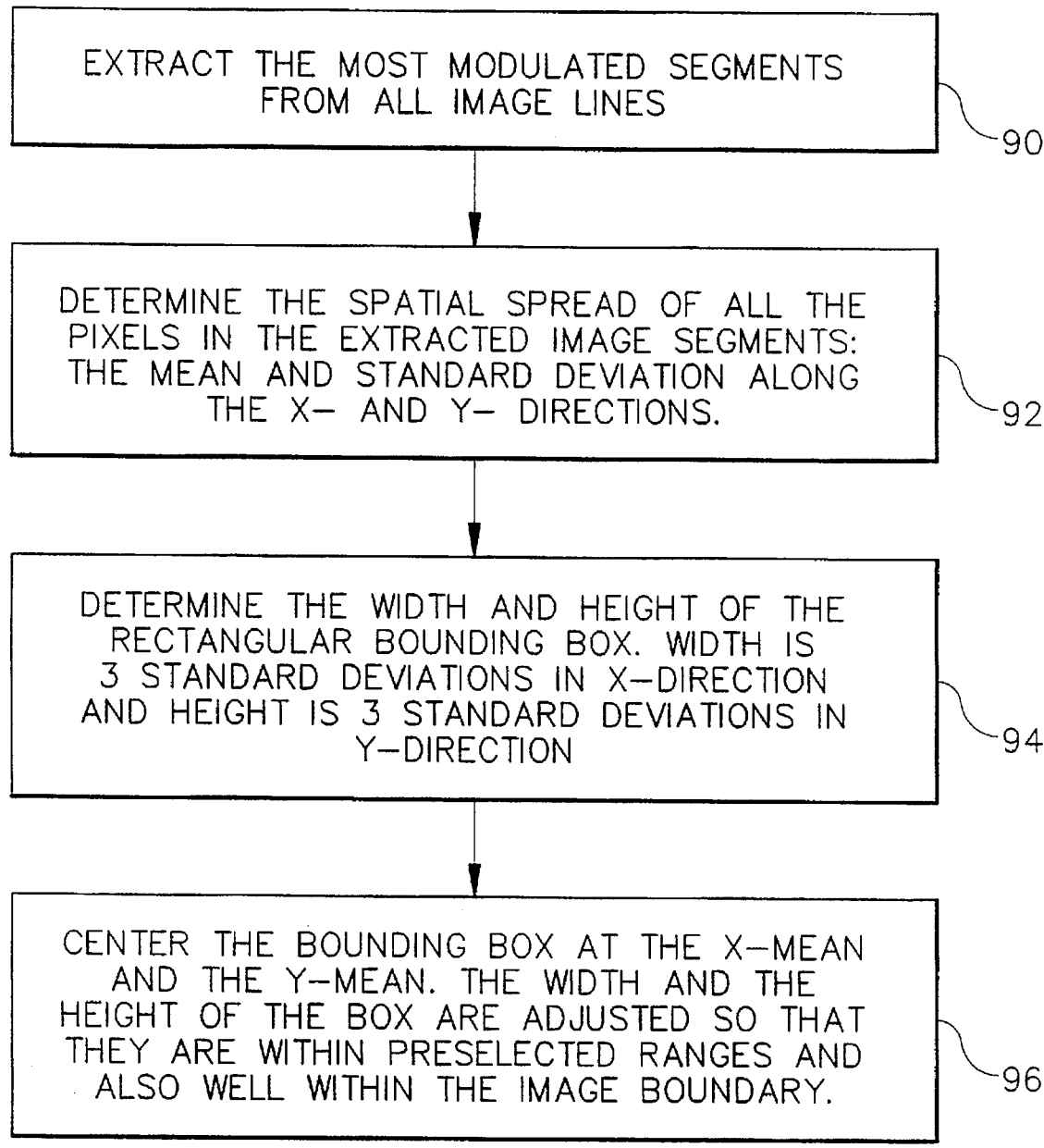
FIG. 7 is a block diagram of a procedure for bounding box determination.

FIG. 7 shows a block diagram of the procedure used for bounding box determination. The bounding box is calculated by estimating the spatial extent and location of the active image areas. The estimation is performed by analyzing the image signal with a previously described routine (FIG. 5) that extracts the most busy segment from an image line, on a line-by-line basis (box 90). The bounding box is determined by finding the mean and standard deviation of the x and y coordinates of all the pixels of the selected busy segments from all the lines in the image (box 92). The bounding box is defined to be the mean plus and minus 1.5 standard deviations (box 94). The size of the bounding box is constrained to be greater than a lower limit and smaller than an upper limit, as set by the users (box 96). If the examination type information is known, the algorithm is made to adjust the limits accordingly. For example, the bounding box of a chest image should not be smaller than 60% of the input image in either dimension. On the other hand, some foot images can use a much smaller bounding box. For an abdomen image, it may be desirable not to have any bounding box at all.

Figure 8:
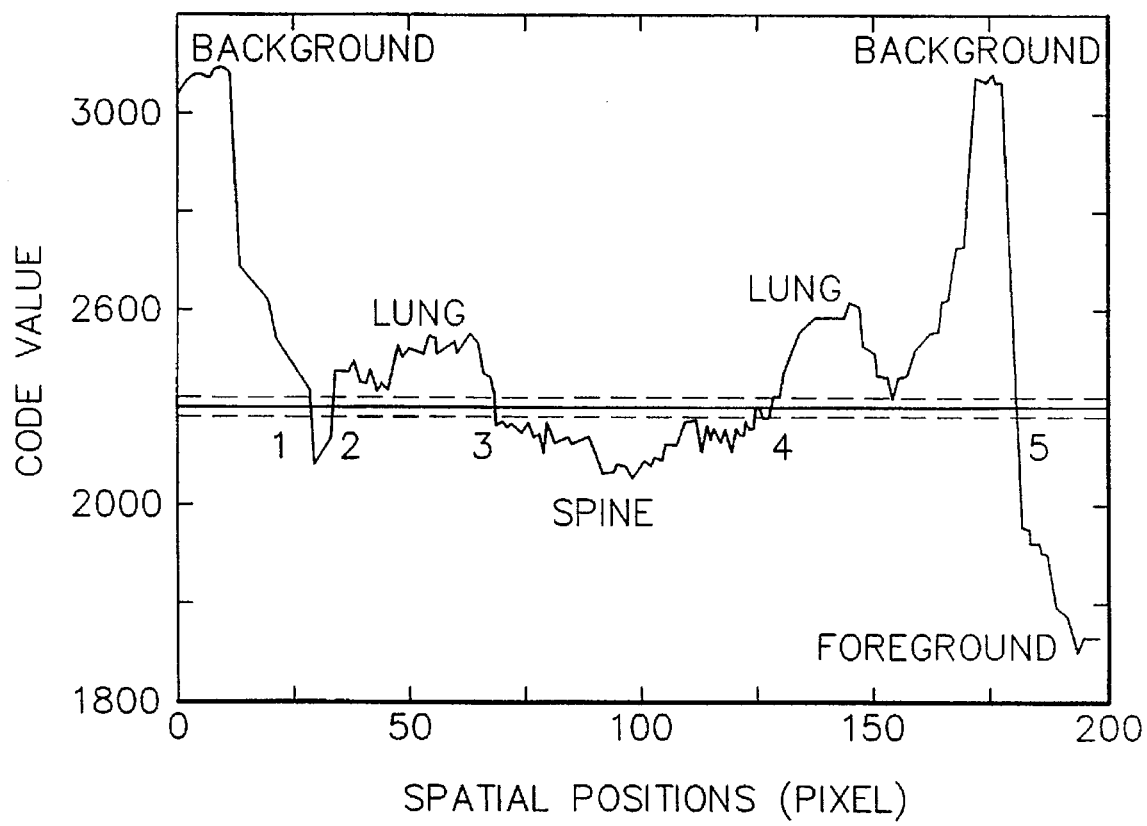
FIG. 8 is a graphical view of code value vs spatial position of a line of a digital radiographic image.

(5) Computing the activity histogram:

(5.1) Level-crossing as a measure of image activity:

The image activity as a function of code value is measured by counting the number of level-crossings at each code value for each image line. Let us take a line of a digital radiographic image, say a PA chest image, as shown in FIG. 8, and look at the code value variation as a function of spatial position (an image profile), it is immediately clear that the code value is modulated up and down many times when the scan line goes across soft tissues and bones. Imagine that if we draw a line through a code value in the image profile in the transition between the soft tissues and the bones, that line will be crossed many times. Thus a simple measure of image activity at an input code value is to count the number of times it is crossed for all lines in the image. If the number of level-crossings is counted for each code value, we obtain a level-crossing histogram, which can be used as a measure of image activity as a function of code value. The level-crossing histogram is used as the activity histogram. In order to remove the transition crossings between the background and the body part, for each image line, the level crossings are only counted for the section of the most, busy segment inside the bounding box and only when the number of level-crossing is greater than a low threshold and less than a high threshold. The high threshold is imposed to avoid any potential problem that may be caused by external objects such as a pacemaker or tubes. However, simple counting of level-crossing will be very sensitive to noise, especially when the noise is highly dependent on the signal, as is the case in digital radiography. It is necessary to count the crossing only when the image exposure varies from significantly below (or above) the level in consideration to significantly above (or below) it, so that pure fluctuations due to noise will not be counted. This can be achieved by setting a lower and a upper threshold proportional to the noise standard deviation at the code value being considered. In the preferred embodiment, the noise threshold is set at 2.5 times the measured noise standard deviation, meaning that fluctuation has to exceed 2.5 standard deviation of the noise before the level-crossing will be counted.

Level-crossings counting can be implemented efficiently. The counting process keeps four variables and two arrays. Two variables, "low1" and "high1", keep track of the lower level and the upper level for the previous pixel. The other two variables, "low2" and "high2", are for the current pixel. These levels are set by adding and subtracting noise margin to and from the code value under consideration. The image signal has to cross from below the lower level to above the upper level (or the other way) to be counted for one crossing. One array, "sign", with one entry for each input code value, stores the status of each code value relative to the previous pixel value. For example, if the previous pixel value is 1528, and the noise margin for 1528 is 24, then low1=1504 and high1=1552. All entries in the array "sign" with indices higher than 1552 have a value +1, meaning that they are above, the previous pixel value, and all entries with indices smaller than 1504 have, a value −1, meaning that they are below the previous pixel value. All entries in this "sign" array are initialized to zero in the beginning of each image line. The other array, "change", keeps track of how many times the sign of each code value has changed as each pixel of the current image line is processed. Continuing with the example, let the current pixel value be 1536 and its noise margin be 22. Then, low2=1536−22=1514 and high2=1536+22=1558. As we move from the previous pixel to the current pixel, the array "sign" has to be updated, and so does the array "change". If high1 is greater than high2, we update the signs in the range of (high2, high1). If low2 is greater than low1, then we update the signs in the range of (low1, low2). In the above example, the signs in the range of (1504, 1514) are updated to −1. If the previous sign at a code value, say 1510, was +1, then we have detected a change of sign, i.e., a level-crossing at 1510 and the corresponding entry in the "change" array is incremented by 1. Since the code value change is usually small from pixel to pixel, the number of updates in the arrays "sign" and "change" is small too. The entire counting process thus can be finished in a short time.

(5.2) Code value co-occurrence as a measure of image activity:

The image activity as a function of code value is measured by counting the number of times different code values occur in an immediate neighborhood in the input image. If there is no signal modulation in an image area, the code values in the immediate neighborhood of a pixel will fluctuate due to noise. When there is signal modulation, the neighboring code values will change with a magnitude much larger than expected from pure noise alone. In this preferred embodiment, let the code value of the central pixel in a 5 pixel by 5 pixel window be C0 and that of the other 24 pixels be C1, C2, . . . C24. Any of the 24 neighboring code values which differs from C0 by more than a noise threshold can be considered as having some signal modulation, i.e., image activity. The number of neighboring pixels exceeding the noise threshold therefore represents the image activity at code value C0. This counting process is performed over all the pixels of the most busy segments inside the bounding box and the counts are accumulated for each code value to form an activity histogram. An efficient counting process is to keep track of the code-value histogram of the 5 pixel by 5 pixel window and update the histogram when the window is moved to the next pixel. The updating is performed by deleting the 5 pixels in the oldest column and adding the 5 pixels in the newest column. Therefore, for each new pixel position, only 10 pixels have to be manipulated instead of 25 pixels.

Figures 2A, 2B, 2C, 2D:
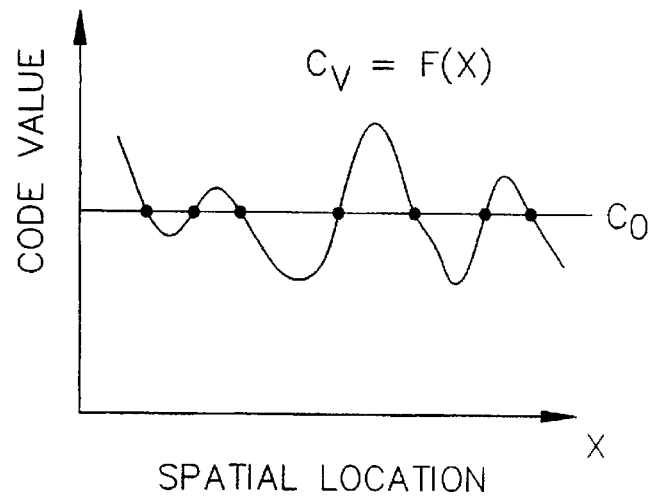
FIGS. 2 $(a)$–$(d)$ show four different activity measures.

(5.3) Edge gradient as a measure of image activity:

The image activity as a function of code value is measured by computing the average edge gradient at each code value. FIG. 2(b) shows an example kernel used to compute the horizontal and the vertical component of the edge gradient of the center pixel. The magnitude of the edge gradient is the square root of the sum of the squares of the horizontal and the vertical components. The edge gradient is computed for all pixels of the most busy segments inside the bounding box and the magnitudes of edge gradients of all the pixels with the same code value are accumulated. The accumulated edge gradient magnitude as a function of code value is used as the activity histogram. Alternatively, the accumulated edge gradients can be divided by the square root (or other function) of the number of pixels contributing to each bin in the histogram.

(5.4) Laplacian contrast as a measure of image activity:

The image activity as a function of code value is measured by computing the average Laplacian contrast at each code value. FIG. 2(a) shows an example of the kernels used to compute the Laplacian contrast of the center pixel. The Laplacian contrast is computed for all pixels of the most busy segments inside the bounding box and the absolute values of the Laplacian contrast of all the pixels with the same code value are accumulated. The accumulated Laplacian contrast magnitude as a function of code value is used as the activity histogram. Alternatively, the accumulated Laplacian contrast can be divided by the square root (or other function) of the number of pixels contributing to each bin in the histogram.

None of the above activity measures explicitly includes the size of an image area as a factor in rendering the input image. The code-value histogram, on the other hand, is much more directly related to the area size information. For some examination types, a weighted average of the various activity histograms and the code-value histogram may provide a more robust measure of image activity. Preferably, the average of the level-crossing histogram and the code-value histogram, computed from all pixels of the most busy segments inside the bounding box, is used as the image activity histogram. Since the code-value histogram contains the size information and the level-crossing histogram contains the activity information, using their average allows us to balance the visual impact of both types of information.

Figure 9:
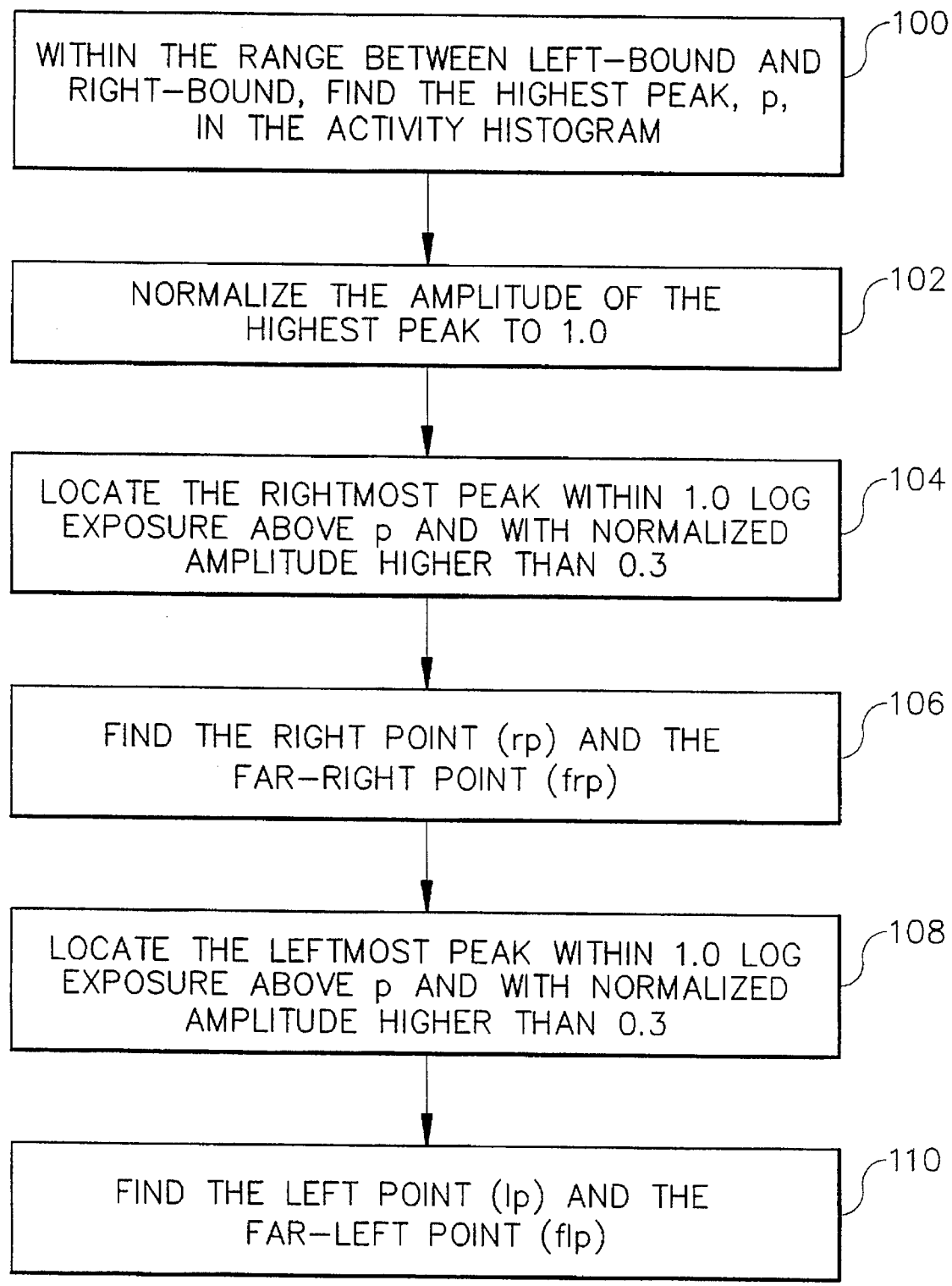
FIG. 9 is a block diagram of a procedure for determining far-left, left, right, and far-right points.

(6) Determining the far-left, the left, the right, and the far-right points:

FIG. 9 shows a block diagram of how this step is accomplished. The highest peak of the image activity histogram is first located (box 100), and its height is used to normalize the histogram so that the highest peak is 1.0 (box 102). Similarly, the code-value histogram is also normalized to its peak. The algorithm then finds the leftmost peak and the rightmost peak, higher than 0.3 and within about 1.0 log exposure from the highest peak of the image activity histogram (boxes 104, 108). Once the rightmost peak and the leftmost peak are located, the algorithm proceeds to determine the right point and the far-right point from the rightmost peak, and the left point and the far-left point from the leftmost peak (boxes 106, 110).

Figure 10:
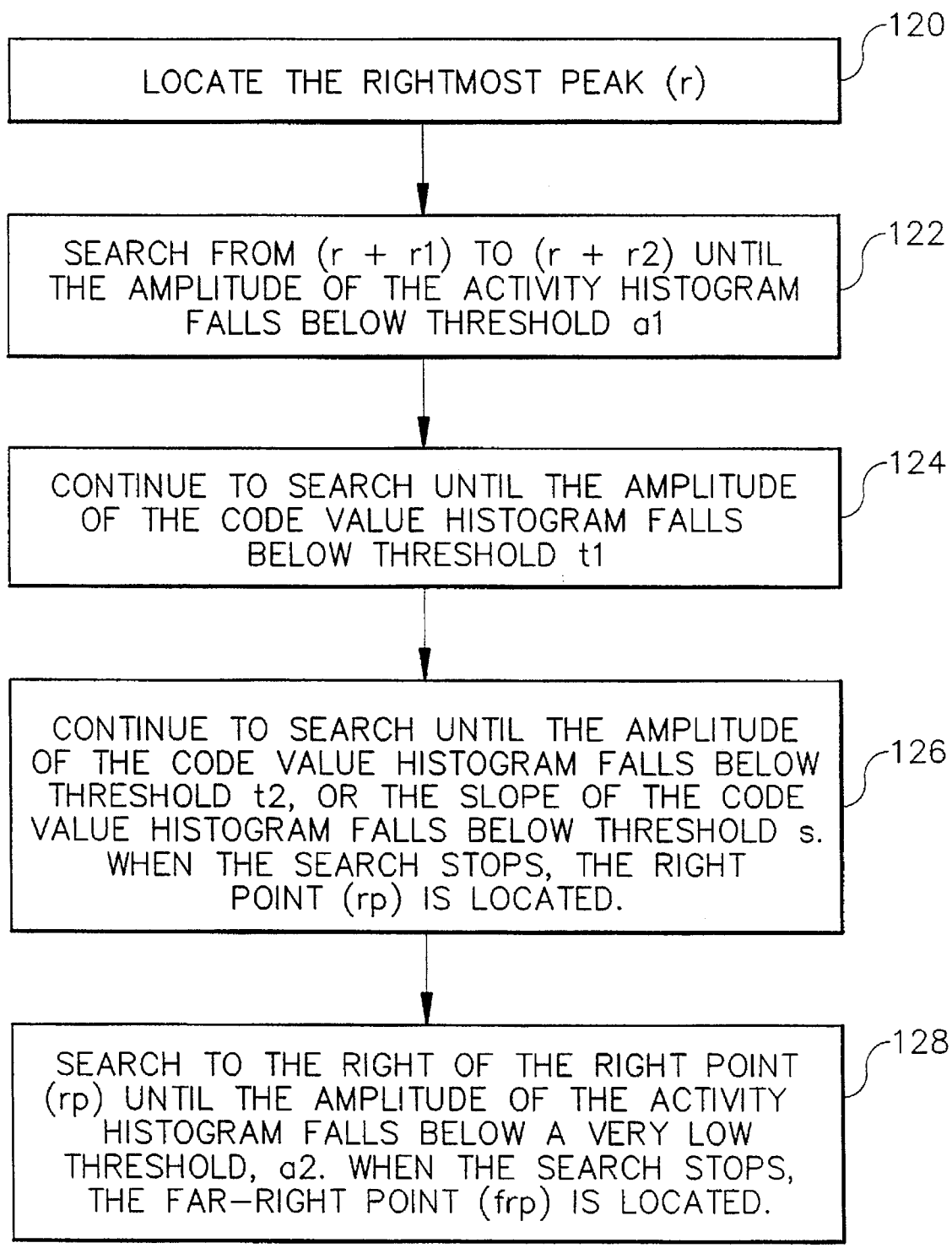
FIG. 10 is a block diagram of a procedure for finding the right and far-right points from the rightmost peak.

FIG. 10 shows how the right point and the far-right point are found. The parameters r1 and r2 are used to restrict the range of the search. The thresholds, a1, a2, t1, t2, and s are predetermined values. Similar procedure is used to find the left point and the far-left point. From the rightmost peak (box 120), the method searches down the right of the rightmost peak until the image activity becomes too small or the height or slope of the code-value histogram becomes too small, or the code value becomes too far from the peak (boxes 122, 124, 126). The far-right point is located (box 128) simply by searching down the peak until the image activity is less than a very low threshold. Similarly, the left point and the far-left point are located to the left of the leftmost peak.

Figure 11:
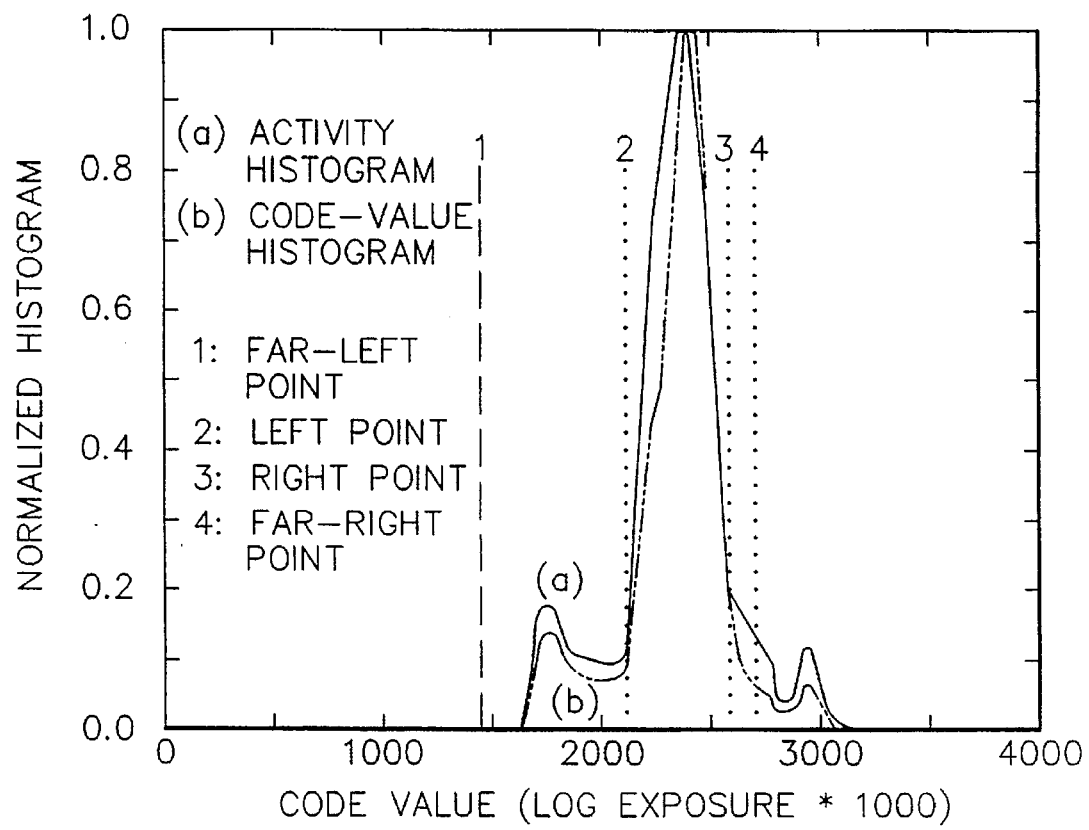
FIG. 11 is a graphical view of the activity histogram and the code-value histogram of a pediatric chest image.

FIG. 11 shows the activity histogram and the code-value histogram of a pediatric chest image. In this case, the two histograms are similar to each other (although this may not be true in general). The far-left point, the left point, the right point and the far-right point found by the algorithm for this image are marked by vertical lines.

The heuristic argument behind the determination of the left-point and the right-point is based on the idea that if the image activity or the number of pixels becomes too small, there is not much information to be rendered. If the left point and the right point are correctly determined, then all the pixels with code values between them will belong to the body part. If the pixels that have code values between the left point and the right point are set to 1 and all other pixels set to 0, then we will have a binary image where ideally all pixels outside of the body part has been set to 0. The body part region should appear as a connected image region without any holes in them. If the left point and/or the right point are not determined correctly, then there may be holes in the region. The code values in these holes are then used to extend the left point and the right point to the lower and higher code values. This heuristic makes sense only if the initial estimates of the left point and the right point are close to the true values and if the background, the foreground, and other irrelevant objects have code values that are not overlapping with that of the body part to be examined. Both assumptions fail for some images and additional precautions should be taken when extending the left point and the right point to fill the holes in the "body part". First, only those holes that are completely surrounded by the body part are reliable candidates. Second, the holes should not contain many values that are close to the (foreground) or the maximum (background) code values. If the examination type information is available, then this hole-filling process can be turned on or off depending on the body part being examined. For example, it is always good to check holes for chest images, but may not be too useful to do so for C-spine images, because the later often contain an overlapping code-value range between the bone and the foreground.

Checking holes in the identified boy part is further followed by a general quality control procedure that checks the general geometrical shape or the spatial distribution of the image region(s) formed, by the pixels whose code values are between the left point and the right point. For example, if the resulting region covers the entire image, except a sizable rectangular hole in the middle of the image, then it is very likely that the left point and the right point have been incorrectly identified and the algorithm should go back to see if other alternative activity peaks should be searched.

(7) Construction of the Tone Scale Curve:

The code-value range between the left point and the right point covers all the pixels that show most significant image activity and therefore should be rendered with good image contrast. The code-value range between the far-left point and the left point covers the pixels that show lower level of activity, and similarly does the range between the far-right point and the right point. The code values outside the far-left and the far-right points contain very little image activity and, therefore, can be rendered essentially as flat fields.

The tone-scale curves used by most computed radiography systems have been designed to provide similar "looks" as those of some film sensitometric curves. In this invention, a completely new family of curves is used to optimize the visual discrimination of fine objects. This family of curves is based on the human brightness perception model under typical x-ray image viewing conditions. The tone-scale curve is designed to render equal log-exposure differences in the radiation image with equal brightness differences in the displayed image.

Figure 12:
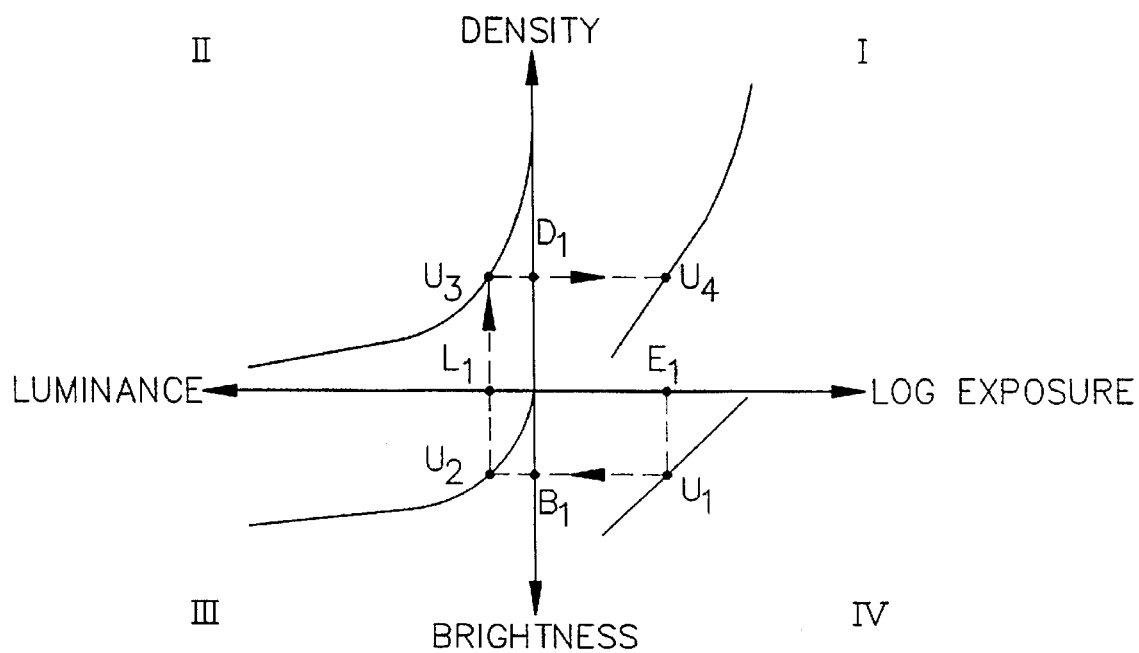
FIG. 12 is a diagrammatic view of how the major part of the visually optimized tone-scale curve is constructed.

FIG. 12 shows an example of how the major part (other than the toe and the shoulder) of the visually optimized tone-scale curve is constructed. In this procedure, the mappings from brightness to luminance, and from luminance to film density are image-independent models. The only image-dependent step in this procedure is the straight line mapping between the log exposure and the brightness. The slope and offset of this straight line are two parameters that are automatically adjusted from image to image. The tone scale curve generated from this step has very sharp cut-offs at both ends of the curve where the minimum density and the maximum density of the output media are reached. These will produce a hard-clipping in the displayed image. It is therefore necessary to roll off both ends (the toe and the shoulder) of the curve.

Figure 13:
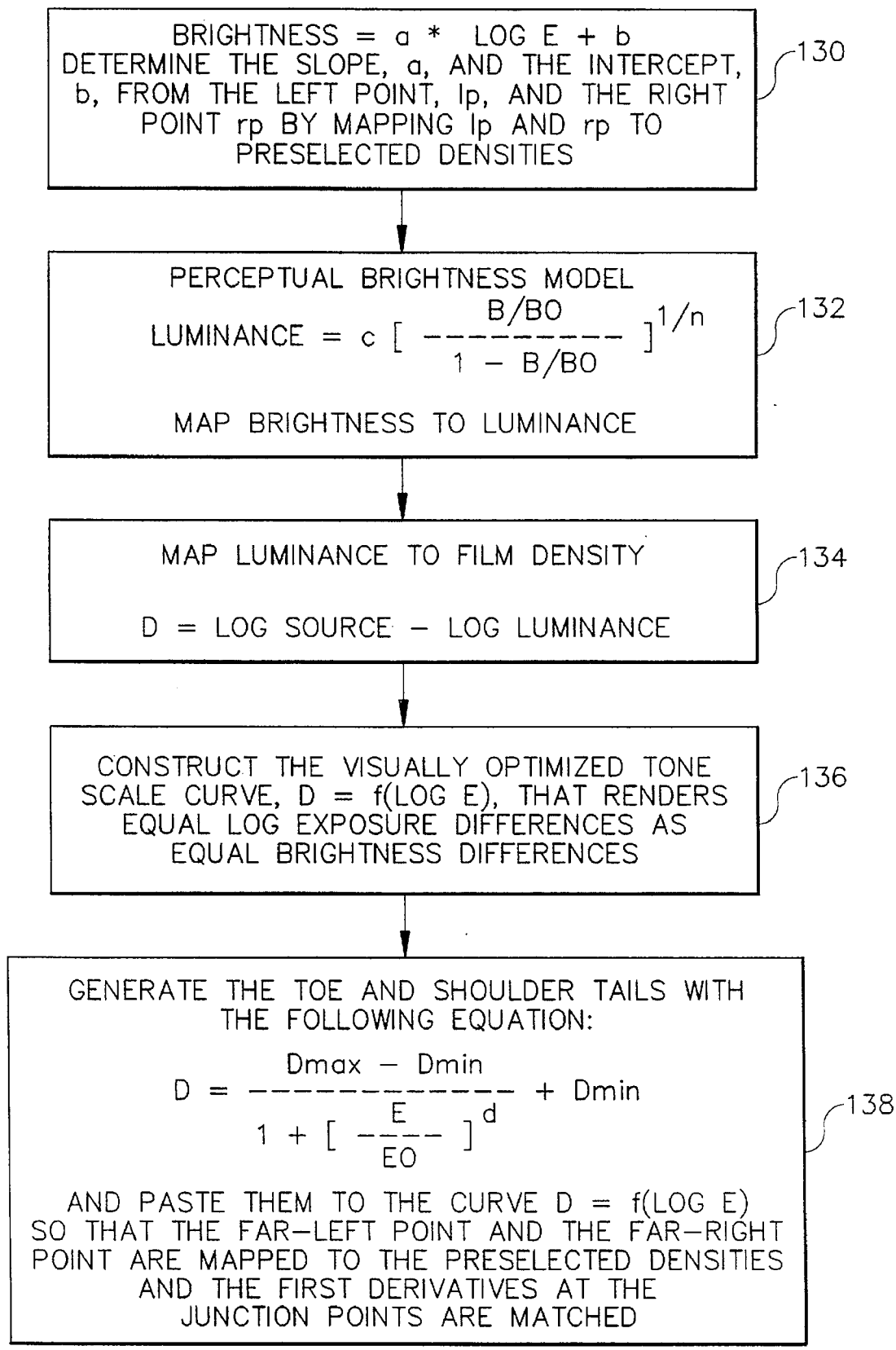
FIG. 13 is a block diagram showing a procedure for constructing the complete tone scale curve.
Figure 14:
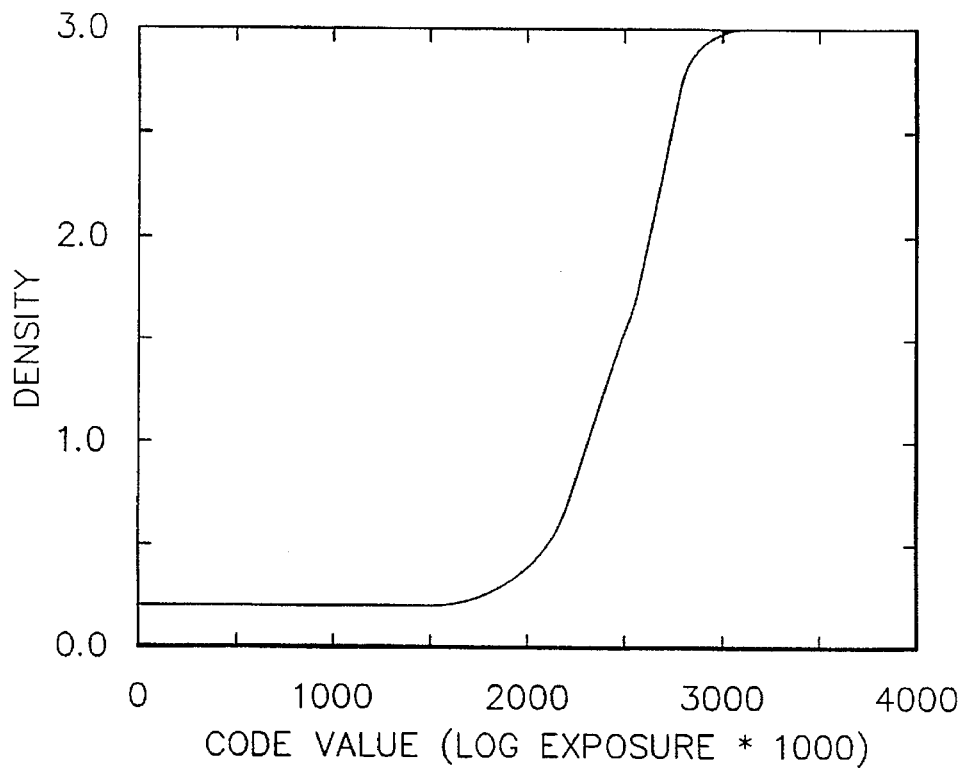
FIG. 14 is a graphical view of a tone scale curve constructed according to the present invention.

FIG. 13 shows the procedure for constructing the complete tone scale curve from the far-left, the left, the right, and the far-right points. First, the linear brightness vs. Log E curve is determined by mapping two log exposure values to two pre-selected density values (box 130). Next, brightness is mapped to luminance (box 132). Then, luminance is mapped to film density (box 134). Combing all these three mappings, the visually optimized tone scale curve is constructed (box 136). Then we need to determine two more log exposure values to be mapped to the two other densities where the toe and the shoulder are to be rolled off. These two more log exposures are two additional parameters needed to generate the final tone-scale curve. The toe and the shoulder of the curve are generated by an analytical equation and then pasted to the visually optimized curve generated according to FIG. 12 (box 138). The tone-scale curve thus has four degrees of freedom that could be determined by the far-left point, the left point, the right point, and the far-right point. The left point and the right point are used to determine the slope and intercept of the linear mapping between the log exposure of the radiation image and the brightness of the printed or displayed image. For example, for a chest image, the right point is mapped to an output film density of 2.1, the left point is mapped to a density 0.5 above the minimum density of the film, and the distance between the left point and the right point is used to determine the contrast of the tone-scale curve. The construction of the tone-scale curves can be made to depend on the body part being examined if that information is available. For example, in order to make skin lines easily visible, the right point can be shifted to a lower density, say 1.6, for hand, foot, and ankle images. The far-left point is used to determine where the toe of the tone-scale curve should begin to roll off, and the far-right point is used to determine where the shoulder of the tone-scale curve should begin to roll off. FIG. 14 shows an example of a tone-scale curve constructed according to this invention.

For some applications, sometimes it is desirable to display the image in reverse tone polarity (called the blackbone tone scale because in normal x-ray image viewing, the bones usually appear white. Reversing the tone polarity makes the bone appear black.) to see a certain part of the body better.

Figure 15:
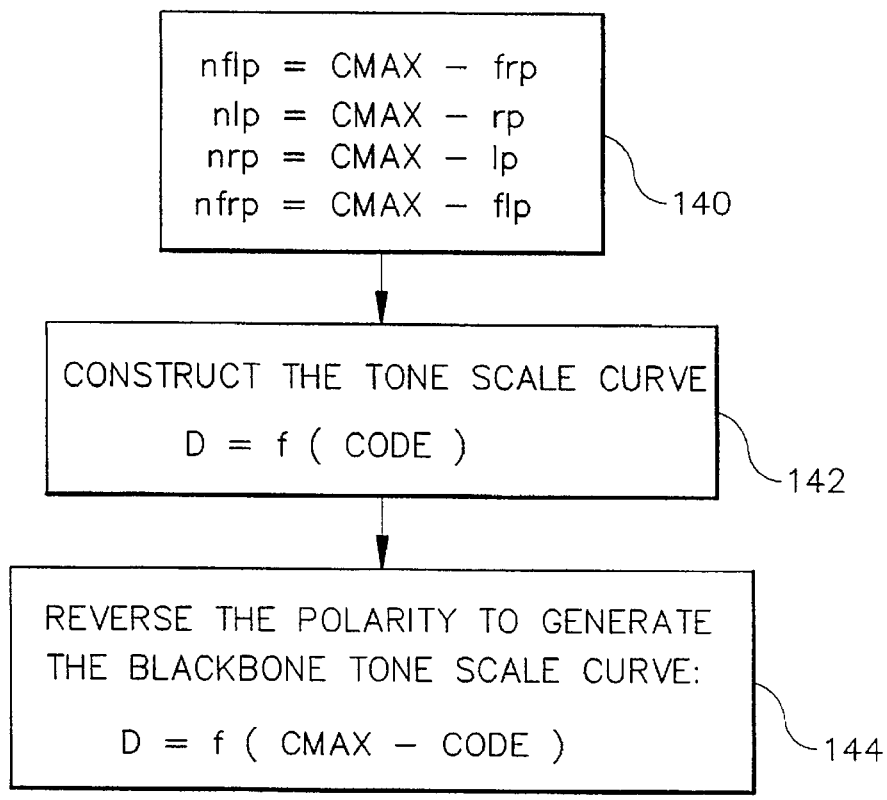
FIG. 15 is block diagram of a procedure for reversing the polarity of a tone scale curve to obtain a black-bone tone-scale curve.

In the current invention, this is accomplished by reversing the roles of the left point with the right point, and the far-left point with the far-right point. For example, if the input code value range is from, 0 to 4095, then using 4095—far-left as the new far-right point, 4095—left as the new right point, 4095—right as the new left point, and 4095—far-right as the new far-left point, will produce a new tone scale curve (boxes 140, 142). Reversing the polarity of the resulted tone-scale curve, by using 4095—code value, will give us the desired blackbone tone-scale curve (box 144). FIG. 15 shows the procedure of accomplishing this, where CMAX refers to the maximum code value, i.e., 4095 for a 12-bit system.

In the apparatus that embodies this invention, the tone-scale curve is implemented as a lookup table with as many entries as the number of the code values. Every pixel in the input image is mapped through this lookup table to produce the tone-scale adjusted output image to be printed or displayed on the output media.

The invention has been disclosed in detail with respect to preferred embodiments thereof, but it will be understood that variations and modifications can be effected within the spirit and scope of the invention.

What is claimed is:

1. A method of automatic tone scale adjustment for digital radiographic images comprising the steps of:

providing an input digital radiographic image;

estimating the image noise as a function of code value of said image;

determining the range of code values in said input image;

determining which way said input image should be processed;

determining a bounding box which contains the region of interest of said input image;

computing the image activity histogram of said input image;

determining four points from said image activity histogram;

constructing the tone-scale curve for said input image; and mapping said input image through said tone-scale curve to produce an output image with good tone scale.

2. The method of claim 1 wherein said providing step includes converting an x-ray image stored in a storage phosphor into said input digital radiographic image.

3. The method of claim 1 wherein said providing step includes digitizing a radiographic image on x-ray film to produce said input digital radiographic image.

4. The method of claim 1 wherein said estimating step includes the steps of exposing a gray scale of uniform patches at different exposures, calculating noise from the standard deviation of the code values in each uniformly exposed area, and interpolating the noise measurements of neighboring exposures.

5. The method of claim 1 wherein said estimating step includes the steps of computing the edge gradient of every pixel of the input image to distinguish the uniform area from the busy area in said image, estimating the noise value from the standard deviation in the uniform area, and interpolating the noise at any level of code value from the noise measurement of neighboring exposures.

6. The method of claim 1 wherein said step of determining the range of code values in said input image includes the steps of: calculating the code-value histogram, setting mincode=the smallest code value in the histogram that has more than 10 pixels, setting maxcode=the largest code value in the histogram that has more than 10 pixels, finding the background peak within an adaptive interval below maxcode, if the background peak is found, determining the first valley to the left of the peak as the right-bound, if the peak is not found, then setting right-bound=maxcode−2* NOISE, setting the left-bound=mincode+2*NOISE.

7. The method of claim 1 wherein said step of determining which way said input image should be processed includes the steps of: extracting the most modulated segments from all image lines in the horizontal direction and calculate the average length, extract the most modulated segments from all image lines in the vertical direction and calculate the average length, and if the average length of the horizontal segments is shorter than that of the vertical segments, then the image activity will be calculated with the horizontal segments, or else, vertical.

8. The method of claim 7 wherein said extracting steps include the steps of: setting an adaptive threshold, CLIFF; partitioning an image line into intervals by a finite state machine; if, within an interval, the code value changes by an amount greater than CLIFF, then labeling the interval as a transition interval, and grouping other pixels on the image line into segments separated by the transition intervals and the image boundaries; fitting each segment with a linear function and using the residual error of the fit as a measure of signal modulation of that segment; and extracting the segment with the largest signal modulation.

9. The method of claim 1 wherein said step of determining the bounding box includes the steps of: extracting the most modulated segments from all image lines; determining the spatial spread of all the pixels in the extracted image segments, the mean and standard deviation along the x- and the y- directions; determining the width and height of the rectangular bounding box, wherein width is 3 standard deviations in the x-direction and height is 3 standard deviations in the y-direction; and centering the bounding box at the x-mean and the y-mean, with the width and height being adjusted so that they are within preselected ranges and also well within the image boundary.

10. The method of claim 1 wherein said step of computing the image activity histogram includes the steps of: processing the digital image on a line by line basis; calculating image activity at each pixel for each image line; and accumulating the image activity for each code value from each image line to form a cumulative activity histogram as a function of code value.

11. The method of claim 1 wherein said step of computing includes the step of measuring image activity by calculating the Laplacian contrast for each pixel.

12. The method of claim 1 wherein said step of computing includes the step of measuring image activity by calculating the edge gradient of each pixel.

13. The method of claim 1 wherein said step of computing includes the step of measuring image activity by calculating the code-value co-occurrence histogram.

14. The method of claim 1 wherein said step of computing includes the steps of measuring image activity by counting the level-crossings for each code value by, for each image line, updating an array that keeps track of the number of sign changes for each code value, and accumulating the number of sign changes from each image line to form a cumulative histogram of level-crossings as a function of code value.

15. The method of claim 1 wherein said step of determining the four points includes the steps of: within the range between left-bound and right-bound, finding the highest peak, p, in the activity histogram; normalizing the amplitude of the highest peak to 1.0; locating the rightmost peak within 1.0 log exposure above p and with normalized amplitude higher than 0.3; finding the right point (rp) and the far right point (frp); locating the leftmost peak within 1.0 log exposure below p and with normalized amplitude higher than 0.3; and finding the left point and the far-left point (flp).

16. The method of claim 1 wherein said step of constructing the tone scale curve includes the steps of; determining the brightness vs. Log E curve from the formula Brightness= a*logE+b by determining the slope a and the intercept b from the left point lp and the right point rp by mapping lp and rp to preselected densities; mapping brightness to luminance using the perceptual brightness model $$\text{Luminance} = c \left[ \frac{B/B0}{1-B/B0} \right]^{\frac{1}{n}} ;$$

mapping luminance to film density, where D=log Source−log Luminance; constructing the visually optimized tone scale curve, D=f(log E), that renders equal log exposure differences as equal brightness differences; and generating the toe and shoulder tails with the following equation D=(Dmax−Dmin)/(1+[E/E0]$^d$)+Dmin.

17. The method of claim 1 wherein, in said determining four points step, left and right feature points are determined and including the step of producing a reversed-polarity tone scale by exchanging roles of said left and right feature points for a normal tone-scale algorithm and then reversing the polarity of the input code values.

18. A method of extracting the important range of code values from an input digital image by computing image activity as a function of code value, comprising the steps of:
  (a) processing the digital image on a line by line basis;
  (b) calculating image activity at each pixel for each image line;
  (c) accumulating the image activity for each code value from each image line to form a cumulative activity histogram as a function of code value; and
  (d) locating the highest peak(s) of the activity histogram and one point on each side (the left and the right) of the peak(s) wherein the histogram height falls below certain thresholds; and
  (e) extracting the range of code values between the left point and the right point, as identified in the previous step.

19. The method of extracting the important range of code values from an input digital image claimed in claim 18, wherein the image activity is measured by calculating the Laplacian contrast for each pixel.

20. The method of extracting the important range of code values from an input digital image claimed in claim 18, wherein the image activity is measured by calculating the edge gradient for each pixel.

21. The method of extracting the important range of code values from an input digital image claimed in claim 18, wherein the image activity is measured by calculating the code-value co-occurrence histogram.

22. A method of extracting the important range of code values from an input digital image by counting the number of level-crossings for each code value, comprising the steps of:
  (a) processing the digital image on a line by line basis;
  (b) for each image line, updating an array that keeps track of the number of sign changes for each code value;
  (c) accumulating the number of sign changes for each code value from each image line to form a cumulative histogram of level-crossings as a function of code value; and
  (d) locating the highest peak of the level-crossing histogram and one point on each side (the left and the right) of the peak where the histogram height falls below certain criteria; and
  (e) extracting the range of code values between the left point and the right point, as identified in the previous step.

* * * * *